US00RE33823E

United States Patent [19]

Nelson et al.

[11] E Patent Number: Re. 33,823

[45] Reissued Date of Patent: Feb. 18, 1992

[54] ROTARY SPRINKLER HEAD

[75] Inventors: Barton R. Nelson; Larry P. Meyer; George L. Sesser, all of Walla Walla, Wash.

[73] Assignee: Nelson Irrigation Corporation, Walla Walla, Wash.

[21] Appl. No.: 343,815

[22] Filed: Apr. 24, 1989

Related U.S. Patent Documents

Reissue of:

[64] Patent No.: 4,660,766
Issued: Apr. 28, 1987
Appl. No.: 777,411
Filed: Sep. 18, 1985

[51] Int. Cl.[5] ..... B05B 3/04

[52] U.S. Cl. ..... 239/222.17; 239/252; 239/264; 239/381; 239/522

[58] Field of Search ..... 239/222.11, 222.17, 239/224, 231, 232, 256, 264, 380, 381, 500, 501, 522, 252

[56] References Cited

U.S. PATENT DOCUMENTS

| | | | |
|---|---|---|---|
| D. 259,438 | 6/1981 | Meyer . | |
| 458,607 | 9/1891 | Weiss . | |
| 1,831,540 | 3/1930 | Nelson . | |
| 1,950,712 | 3/1934 | Coles et al. | 239/256 X |
| 2,108,787 | 2/1938 | Coles et al. . | |
| 2,273,401 | 2/1942 | Ferrando et al. | 239/222.17 |
| 2,488,234 | 11/1949 | Perry | 239/222.17 |
| 3,006,558 | 10/1961 | Jacobs . | |
| 3,292,863 | 12/1966 | Nelson | 239/256 X |
| 3,415,258 | 12/1968 | Gilson . | |
| 3,468,485 | 9/1969 | Sully | 239/264 X |
| 3,532,273 | 5/1968 | Siddall et al. . | |
| 3,651,903 | 3/1972 | Butler et al. | 188/290 |
| 3,861,503 | 1/1975 | Nash | 188/290 X |
| 3,865,216 | 2/1975 | Gryglas | 188/290 |
| 3,979,066 | 9/1976 | Fortner . | |
| 4,062,494 | 12/1977 | Healy | 239/264 X |
| 4,121,769 | 10/1978 | Drori | 239/222.17 |
| 4,221,333 | 9/1980 | Rodriguez . | |
| 4,261,515 | 4/1981 | Rosenberg et al. . | |
| 4,356,972 | 11/1982 | Vikre | 239/222.17 X |
| 4,440,345 | 4/1984 | Figwer et al. . | |
| 4,492,339 | 1/1985 | Kreitzberg . | |
| 4,498,628 | 2/1985 | Tucker | 239/381 |
| 4,527,675 | 7/1985 | Omata et al. . | |
| 4,560,108 | 12/1985 | Rubinstein | 239/222.17 |
| 4,565,266 | 1/1986 | Omata | 188/322.5 |

FOREIGN PATENT DOCUMENTS

| | | | |
|---|---|---|---|
| 48682 | 7/1971 | Australia . | |
| 403351 | 1/1923 | Fed. Rep. of Germany | 239/222.17 |
| 1632916 | 8/1970 | Fed. Rep. of Germany . | |
| 1321580 | 6/1963 | France . | |
| 2019704 | 2/1979 | United Kingdom . | |

OTHER PUBLICATIONS

Rain Bird "CPR-RSN: The Low Pressure Spry with the Rotating Deflector and Slip-Fit EZ Change Nozzles", 1984.
Agrifim Irrigation Inc. "Agri-Jets", 1981.
Dan Sprinklers "Reguated Sprinklers and Irrigation Equipment".
James Hardie Irrigation Technical Manual, 1984.
Solcoor Inc. Irrigation Division, 1984.
RIS Irrigation Systems Micro-Sprinkler.
NIFCO Inc., Oil Dampers, specification.

*Primary Examiner*—Andres Kashnikow
*Assistant Examiner*—William Grant
*Attorney, Agent, or Firm*—Nixon & Vanderhye

[57] ABSTRACT

A rotary sprinkler head comprising a sprinkler body devoid of any operative dynamic seals for communicating a source of water under pressure with an outlet for directing water under pressure communicated therewith into an atmospheric condition in a primary stream having a generally vertically extending axis. A rotary distributor is provided which has surfaces for engaging the primary stream (1) to establish a reactionary force component acting on the distributor in a direction tangential to the rotational axis thereof so as to effect rotational movement thereof about its axis of rotation and (2) to direct the primary stream engaged thereby in the form of a pattern forming stream or streams including at least one stream moving away from the distributor in a direction having a substantial component extending outwardly from the generally vertical axis of the primary stream so as to define the radius of the circular spray pattern. A speed reducing assembly is operatively associated with the distributor for reducing the rotational speed of the distributor resulting from the reactionary force component from a relatively high whirling speed which would occur without the speed reducing assembly to a relatively slow speed.

60 Claims, 7 Drawing Sheets

Fig. 1
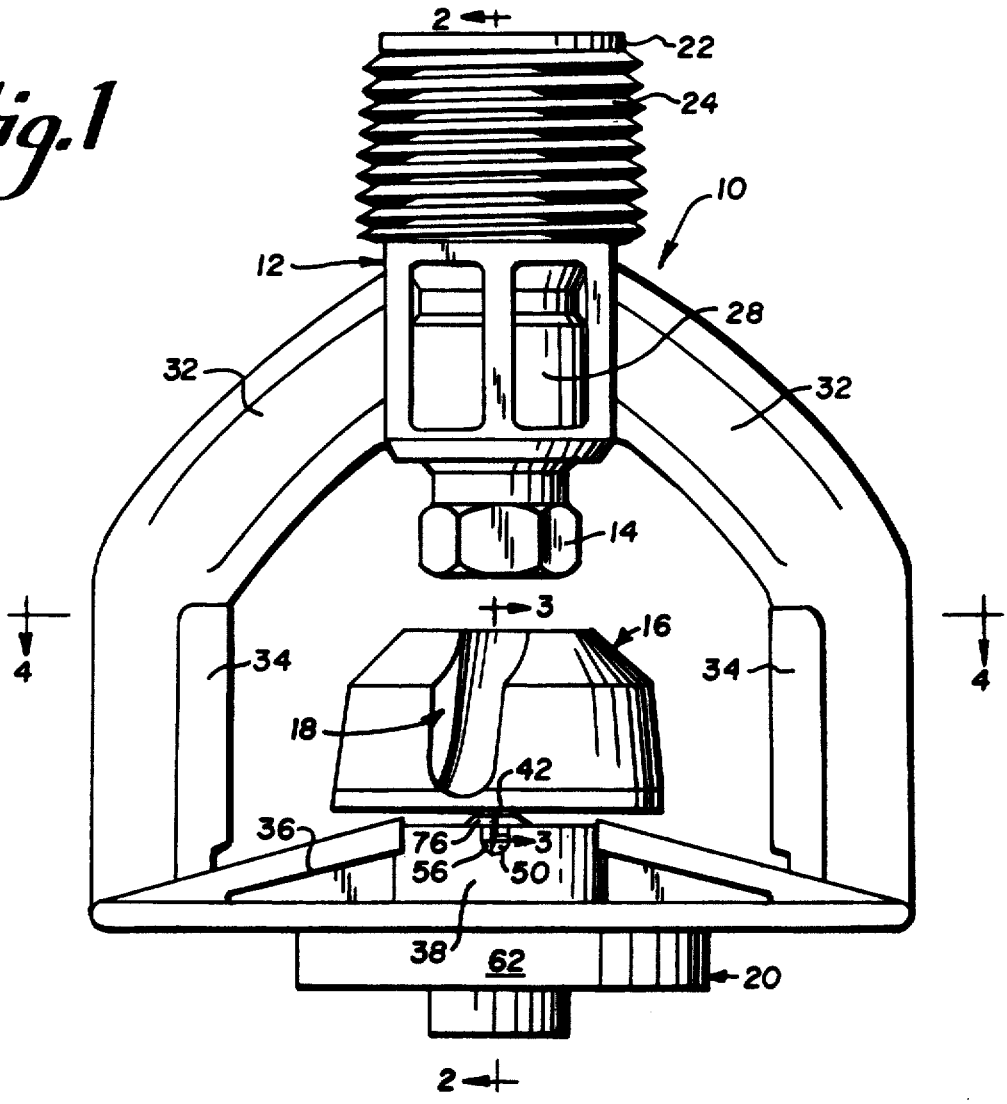
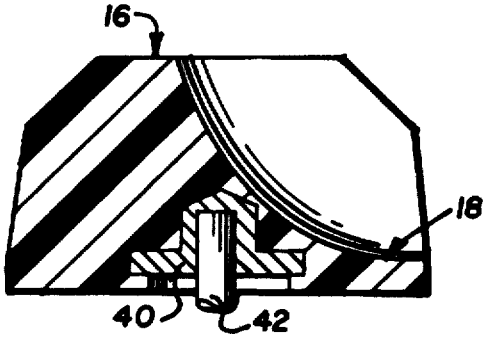
Fig. 3

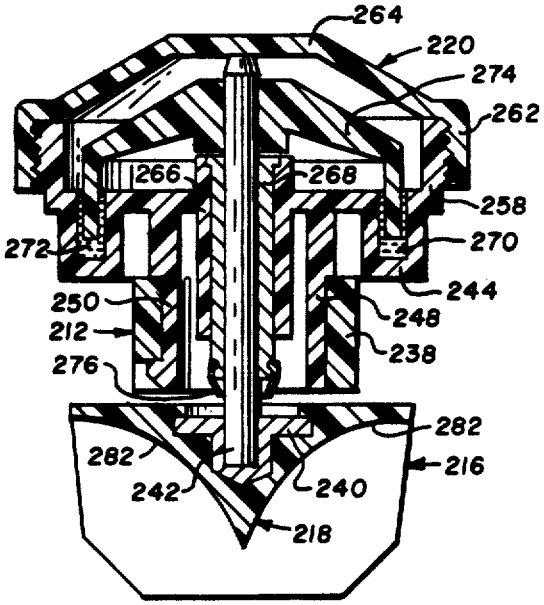
Fig. 8
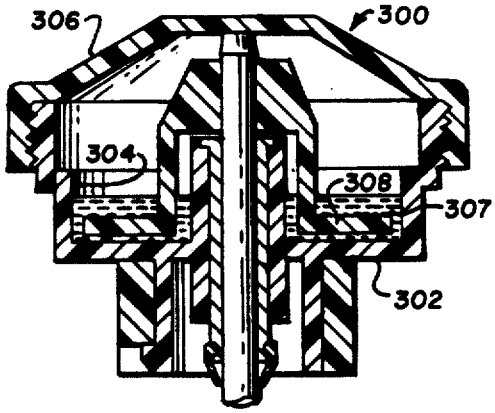
Fig. 11
Fig. 12
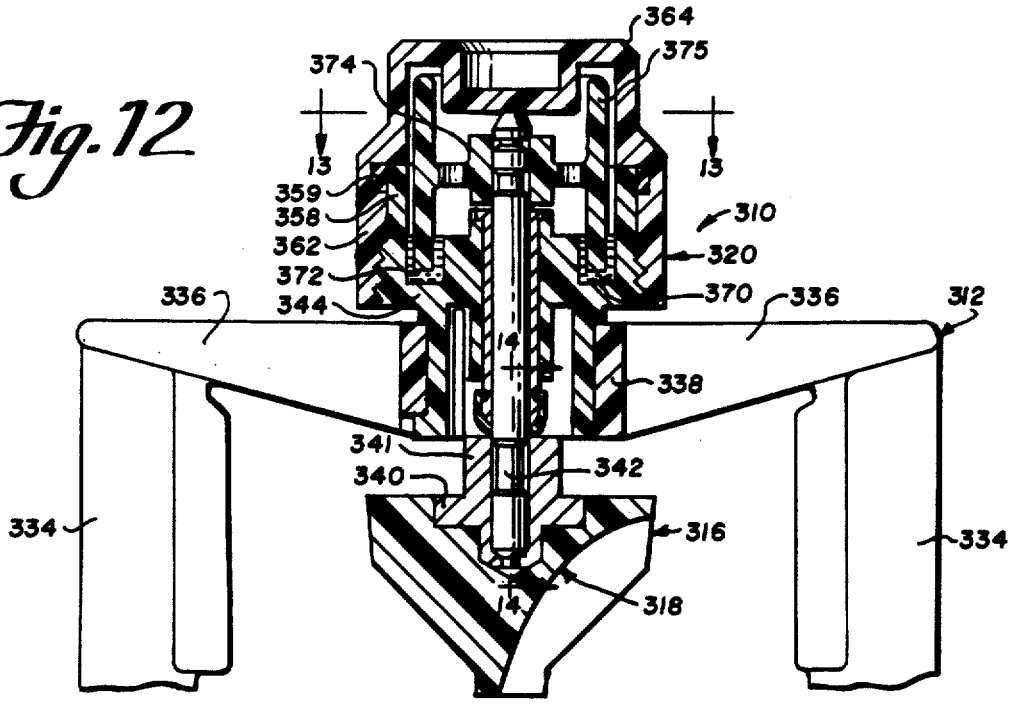

ROTARY SPRINKLER HEAD

Matter enclosed in heavy brackets [ ] appears in the original patent but forms no part of this reissue specification; matter printed in italics indicates the additions made by reissue.

This invention relates to sprinklers and more specifically to sprinkler heads of the type adapted to distribute a source of water under pressure to a predetermined ground pattern area.

It has been conventional wisdom for many years that the best and most efficient sprinkler head is one which is capable of delivering a given source of water to the largest possible sprinkler pattern area. It is also generally accepted that the best and most efficient sprinkler head for accomplishing this result is the so-called step-by-step impact sprinkler or the step-by-step impulse sprinkler in larger sizes. The step-by-step rotary sprinkler heads achieve maximum throw by directing the source of water under pressure upwardly and outwardly which enables the water to be extended to a maximum extent. By then slowly rotating the extended water source in step-by-step fashion a maximum area can be covered.

In recent years the combined effect of decreasing water supplies and increasing energy costs has brought this conventional widsom into question. Maximum throw requires that the source of water be at relatively high pressure. Moreover, such high pressure is desirable if not necessary in order to insure that the projected stream will break up into water particles of a desired size. The necessity to deliver a predetermined gallonage of water per unit time at a relatively high source pressure provides a significant increase in energy costs. The same gallonage per unit time can be delivered at substantially lesser cost where the source pressure can be relatively low. One can imagine reducing the source pressure to a step-by-step impact sprinkler to the point that the stream remains intact and falls almost as an entity on the ground. Moreover, it will be understood that in addition to the need for pressure to break up the stream into desired droplet sizes, this energy is also needed to accomplish the cycling of the impact arm. Consequently, in order to reduce the source pressure to a point where significant energy savings could be obtained, the conventional wisdom of considering the sprinkler head which is capable of distributing the water to the largest possible pattern area has been dropped in favor of providing fixed spray heads having instantaneous circular patterns which can be overlapped one with respect to another to provide coverage over the same pattern area as a single impact sprinkler. Arrangements of this type requires the provision of more pipe but this added cost was considered to be offset by the energy savings that could be effected. For example, a typical spray head may have an instantaneous spray pattern which has a radius substantially less than the distance that the same amount of water under the same pressure could be projected radially outwardly as a stream. Consequently, even where additional piping is provided to densify the number of sprinkler heads provided there still exist the desirability that each sprinkler head should be capable of projecting the source water delivered thereto to the greatest possible pattern area.

In summary, it can be stated that conventional impact sprinkler heads serve to best achieve the end result of distributing a given source of water and pressure to the largest possible pattern area, they nevertheless have the following disadvantages (1) they require a relatively high pressure to operate properly (2) they are subject to possible self-inflicted damage due to the repeated impacts to which they are routinely subjected and (3) they are subject to seal failure due to the fact that they must include a dynamic seal assembly capable of remaining effective to seal against relatively high pressures over a period of repeated impact operation.

In order to understand the requirement for high pressure in the operation of a typical conventional impact sprinkler head, it is important to consider first that the source of water to be distributed by an impact sprinkler head is initially projected into the atmospheric condition prevailing at the ground site to be sprinkled as a continuously flowing jet stream directed upwardly and radially outwardly. During each impact cycle there is a period of time when the jet stream is allowed to flow outwardly unobstructed and a period of time when the jet stream is obstructed and deflected by the various surfaces of the impact arm drive spoon. The water which remains unobstructed in the jet stream falls on the ground pattern at the outer portions thereof whereas the obstructed water falls on the inner portions. It is the existence and utilization of the unobstructed radially outwardly extending jet stream which enables the impact sprinkler head to cover a maximum pattern area. However, it is also this characteristic which dictates the need to operate the sprinkler head at relatively high pressures. Several factors relating to this characteristic enter into the pressure limitation. One factor relates to the break up of the jet stream before it falls onto the ground. For a given outlet orifice size, adequate break up of the stream is a direct function of output pressure. As the jet stream leaves the nozzle, the output pressure energy is converted into velocity energy and the velocity of the jet stream as it leaves the nozzle outlet largely determines whether or not the stream will subsequently break up into desired droplet sizes before ground engagement. As the velocity decreases droplet size is likely to increase until a point is reached under the particular atmospheric conditions presented where droplet size is big enough to have an adverse effect on the plants and/or soil in or near the sprinkler pattern area. A similar situation is presented with respect to the distribution of the drive spoon obstructed water, although the threshold pressure where adverse effects become manifest is probably below that with respect to the unobstructed water. A third factor relates to the energy level of the continuous jet stream necessary to accomplish the operative cycling of the impact arm. Here again, since the cycling is accomplished by the jet stream after it leaves the nozzle its total energy at this point is almost totally represented by its velocity energy (i.e. pressure energy and potential energy are both negligible). Thus, the energy level required to accomplish cycling of the impact arm is likewise a function of stream velocity. Again, the threshold pressure where adverse effects become manifest may be below that of both of the other two factors.

With the above in mind, it will be appreciated that efforts have been made in the past to lower the threshold pressure required become of the first two factors, by either (1) modifying the nozzle so as to modify the nature of the jet stream projected to improve break up at lower pressure (see, for example, commonly assigned U.S. Pat. No. 4,492,339.) or (2) modifying the jet stream by structural surface engagement after it has passed the point of stream engagement by the drive spoon to improve break up at lower pressures (see, for example, commonly assigned U.S. Pat. No. 4,566,632).

Since these efforts result in diminishing the energy level of the jet stream before it reaches the ground, they necessarily result in a decrease in the pattern area covered. This decrease may be significant when it is considered that a 30% decrease in radius of throw reduces the area of coverage by more than half. Moreover, where the jet stream energy reduction takes place at the nozzle, there is less energy available in the jet stream when it reaches the drive spoon to accomplish impact arm cycling and hence the energy required to effect impact arm cycling becomes a pressure threshold establishing factor. This energy level is determined by the energy required to move the sprinkler head body one step which, in turn, is a factor of the mass of the rotating sprinkler body (and contained water) and the drag of the spring pressed brake and dynamic seal assembly.

In view of the above, as a practical matter, where the source of water under pressure is at a low level fixed spray heads have been recently utilized instead of rotary impact sprinkler heads. A characteristic of a spray head is that the instantaneous spray pattern and the full cycle spray pattern of the sprinkler head itself are for all intents and purposes one and the same. Thus, the coverage pattern area is materially reduced in comparison with a sprinkler head, such as the impact head, where the full cycle spray pattern is greater than the instantaneous pattern by a factor significantly greater than one.

There quite clearly exists a need for a sprinkler head which can operate at pressures below conventional impacts with a full circle pattern to instantaneous pattern ratio significantly above one and at the same time eliminate the other two disadvantages of impact sprinkler heads enumerated above, namely (1) self-inflicted damage and wear due to repeated impacts and (2) operational dynamic seal failure due to wear and pressurized contamination by sand particles, etc.

It is an object of the present invention to fulfill the above identified need. In accordance with the principles of the present invention, this objective is obtained by providing a rotary sprinkler head comprising a sprinkler body having an outlet and a structure devoid of any operative dynamic seals for communicating a source of water under pressure with the outlet so that the latter will serve to direct the water under pressure into an atmospheric condition in a primary stream having a generally vertically extending axis. A rotary distributor is rotatably mounted in engaged relation with respect to the primary stream. The rotary distributor has stream engaging surfaces which serve (1) to establish a reactionary force component acting on the distributor in a direction tangential to the rotational axis thereof so as to effect rotational movement thereof about the axis of rotation and (2) to direct the primary stream engaged thereby in the form of pattern forming stream means including at least one stream moving away from the distributor in a direction having a substantial component extending radially outwardly from the generally vertical axis of the primary stream. A speed reducing assembly is operatively associated with the distributor for reducing the rotational speed of the distributor resulting from the reactionary force component from a relatively high whirling speed which would occur without the speed reducing assembly to a relatively slow speed so related to the distributor stream engaging surfaces forming the pattern forming stream means as to permit (1) the one stream to leave the distributor stream engaging surfaces with sufficient stream integrity to flow outwardly a distance substantially as great as the same said one stream would flow if the distributor were held stationary and (2) all of the pattern forming stream means including said one stream to be distributed within a generally circular pattern with a desired droplet size and with a desired water distribution within the generally circular pattern, the radius of the generally circular pattern being defined by the maximum extent of flow of said one stream.

It can be seen that the operative dynamic seal failures sometimes heretofore experienced in conventional impact sprinkler heads are eliminated by eliminating the need to use any such seals. Instead, the source of water under pressure is confined by static structure until directed into an atmospheric condition as a primary stream having generally vertically extending axis. This feature of statically confining the water under pressure and discharging it into an atmospheric condition as a primary stream having a generally vertically extending axis further eliminates the need to effect a rotational movement of a relatively large pressure confining structural mass having an operative dynamic pressure seal and spring pressed brake assembly, such as in the case with conventional impact heads, a requirement, as aforesaid, which materially increases the input energy level of the stream required to sequence the impact arm. Instead, a relatively small rotary distributor used in conjunction with a speed reducing assembly performs the function of distributing the water radially outwardly from the primary stream. A highly advantageous feature of utilizing a small rotary distributor is that it can be a simple plastic molding capable of simple replacement to achieve whatever pattern size, droplet size and distribution characteristics are desired. The stream engaging surfaces which handle the water at atmospheric conditions are formed to establish a reactionary force component which in the absence of a speed reducing assembly would impart a relatively high whirling speed to the rotary distributor. The speed reduction assembly reduces this relatively high whirling speed to a relatively slow speed enabling the ratio of the full cycle pattern to the instantaneous pattern to be significantly greater than one. The slow speed of the rotary distributor enables the water engaging surfaces thereof to direct the water flowing in the primary stream in an outward direction with respect to the vertical axis of the latter by changing its direction of movement and acting upon it in a manner to condition it for subsequent break up without reducing its energy level to a value less than that required to accomplish movement through a full cycle. Moreover, by utilizing a smooth continuous movement rather than repeated impacts to accomplish a full cycle of movement, the disadvantage of damage and wear resulting from repeated impacts is eliminated.

Another object of the present invention is the provision of a rotary sprinkler head of the type described which is simple in construction, effective in operation and economical to manufacture.

These and other objects of the present invention will become more apparent during the course of the following detailed description and appended claims.

The invention may best be understood with reference to the accompanying drawings wherein illustrative embodiments are shown.

In the drawings:

FIG. 1 is a side-elevational view of one form of a rotary sprinkler head embodying the principles of the present invention;

FIG. 3 is a sectional view taken along the line 3—3 of FIG. 1;

FIG. 8 is a sectional view taken along the line 8—8 of FIG. 7;

FIG. 11 is a vertical sectional view of a modified form of speed reducing assembly utilized in the sprinkler head shown in FIGS. 7 and 8 in lieu of the speed-reducing assembly shown therein;

FIG. 12 is a fragmentary side elevational view partly in vertical section illustrating still another sprinkler head embodying the principles of the present invention, which sprinkler head is particularly adapted to be used in either one of two operative positions which are inverted in relation to one another;

Figure 2:
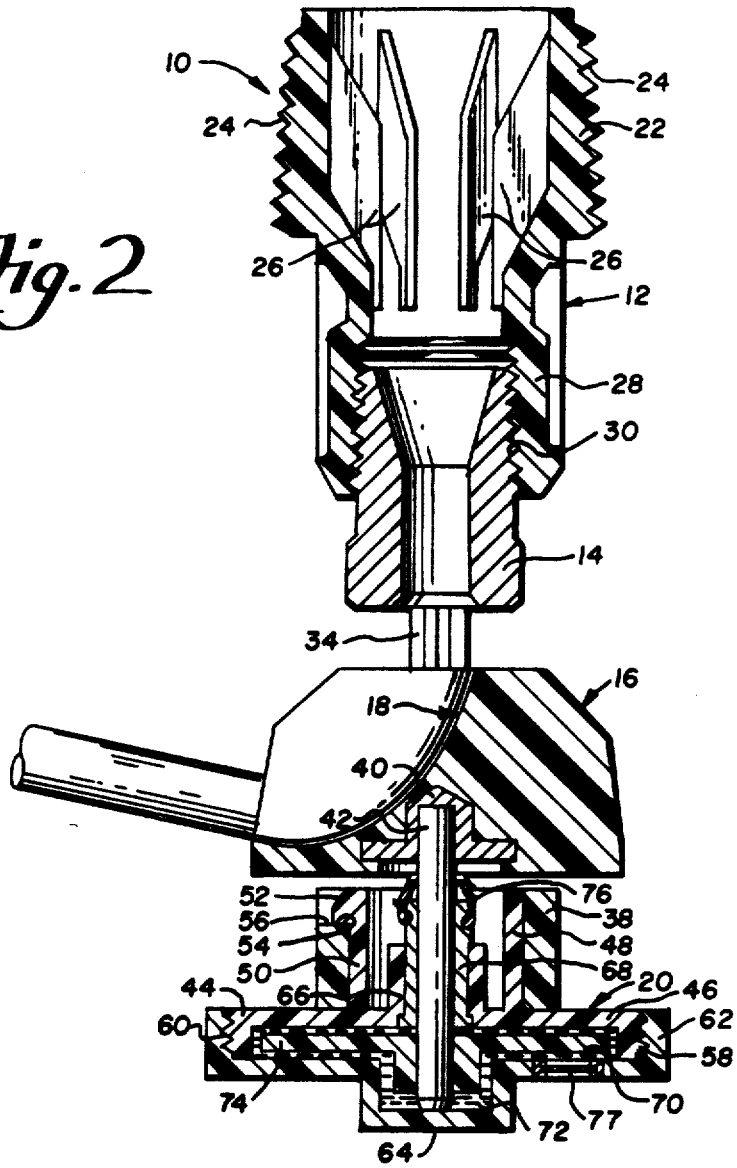
FIG. 2 is a sectional view taken along the line 2—2 of FIG. 1.
Figure 4:
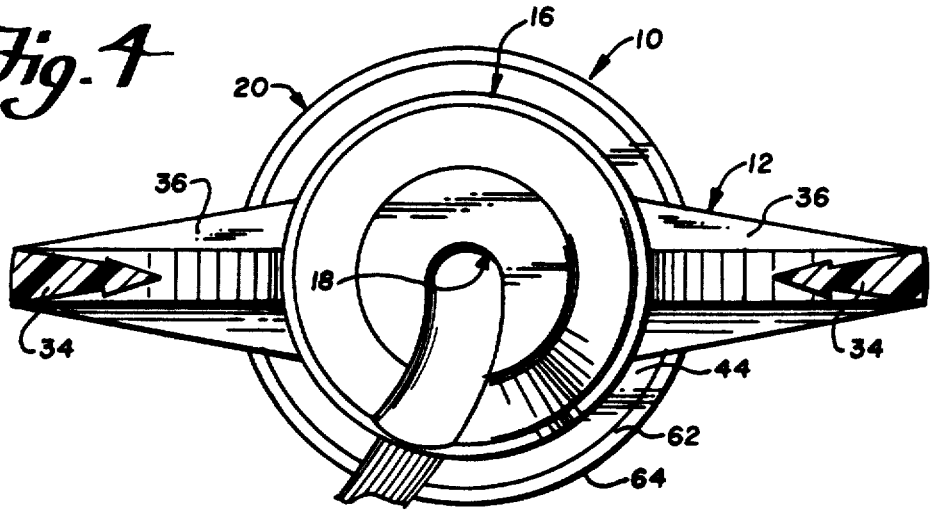
FIG. 4 is a sectional view taken along the line 4—4 of FIG. 1.

Referring now more particularly to the drawings, there is shown in FIGS. 1-4 one embodiment of a sprinkler head, generally indicated at 10, which embodies the principles of the present invention. In general, the sprinkler head includes a sprinkler body, generally indicated at 12, which as shown, is a static structure adapted to be connected to a source of water under pressure. An outlet nozzle 14 is positioned on the sprinkler body 12 so as to direct the source of water under pressure into an atmospheric condition at the site to be sprinkled in a primary stream having a generally vertically extending axis. The sprinkler head 10 also includes a rotary distributor, generally indicated at 16, which is mounted for rotational movement about a rotational axis which preferably is concentric with the vertical axis of the primary stream. The rotary distributor 16 includes surface means, generally indicated at 18, for engaging the primary stream (1) to establish a reactionary force component acting on the distributor 16 in a direction tangential to the rotational axis thereof so as to effect rotational movement thereof about its rotational axis and (2) to direct the primary stream engaged thereby in the form of pattern forming stream means which includes at least one stream moving away from the distributor 16 in a direction having a substantial component extending radially outwardly from the generally vertical axis of the primary stream. Finally, the rotary sprinkler head 10 also includes a speed reducing assembly 20 which is operatively associated with the rotary distributor 16 for reducing the rotational speed of the distributor 16 resulting from the reactionary force component from a relatively high whirling speed which would occur without the speed reducing assembly 20 to a relatively slow speed so related to the distributor surface means 18 forming the pattern forming stream means as to permit (1) the one stream to leave the distributor surface means 18 with sufficient stream integrity to flow outwardly a distance substantially as great as the same one stream would flow if the distributor 16 were held stationary and (2) all of the pattern forming stream means including the one stream to be distributed within a generally circular pattern with a desired droplet size and with a desired water distribution within the generally circular pattern. The radius of the circular pattern is defined by the maximum extent of flow of the one stream.

In the embodiment shown in FIG. 1, the sprinkler body 12 takes the form of a known sprinkler body which is utilized in a spray head currently offered for sale on the market by the owner of the present application. The design of the sprinkler body of the spray head is substantially illustrated in commonly assigned U.S. Pat. No. DES 259,438. The sprinkler body 12 constitutes a molding of plastic material as, for example, nylon. It will be understood that other suitable plastic materials may be utilized if desired. The sprinkler body 12 is molded to include a tubular inlet portion 22 which has exterior threads 24 for engaging within a conduit or the like (not shown) which contains a source of water under pressure. As shown, the interior of the tubular inlet portion 22 is provided with a series of annularly spaced longitudinally extending guide fins 26 which serve to smoothly direct the water to an adjacent tubular outlet portion 28 formed on the sprinkler body. The tubular outlet portion 28 is interiorly threaded, as indicated at 30, to receive the outlet nozzle 14. As shown, the outlet nozzle 14 is of conventional metal construction and is configured to direct the water under pressure entering the tubular inlet portion 22 into the atmospheric conditions at the site containing the pattern area to be sprinkled as a downwardly directed primary stream having a substantially vertical axis which is coincident with the axis of both the tubular inlet portion 22 and the tubular outlet portion 28.

The particular sprinkler body 12 shown in FIGS. 1–4 provides a supporting depending structure for the rotary distributor 16. This supporting structure is in the form of a pair of integral mounting arm portions 32 which extend outwardly and downwardly from opposite sides of the tubular outlet portion 28. Extending downwardly from the arm portions 32 is a pair of parallel vertically extending strut portions 34, the lower ends of which are fixedly integrally interconnected a pair of horizontally inwardly extending portions 36 interconnected by a tubular central mounting portion 38. The strut portions of the sprinkler body are disposed in a position to be engaged by the stream of the sprinkler head and to minimize the effect of this engagement on the resulting distribution of water in the pattern area, the strut portions 34 have a stepped triangularly shaped tapered cross-sectional configuration, as can be seen from FIG. 4.

The central tubular mounting portion 38 in the spray head depicted in the aforesaid design patent has mounted therein a stationary spray deflector plate. In accordance with the principles of the present invention, the combined rotary distributor 16 and associated speed reducing assembly 20 is arranged to be supported within the tubular mounting portion 38 in lieu of the fixed spray plate.

It will be understood that an arrangement of the type described above wherein the spray head type sprinkler body is utilized and the primary stream established therein is directed downwardly finds particular use in moving irrigation systems, such as pivot move systems. An example of such a use is disclosed in commonly assigned U.S. Pat. No. 4,405,085 wherein the spray heads 22 shown therein could readily be replaced by rotary sprinkler heads 10 of the present invention, such as illustrated in FIGS. 1–4.

It will be understood however that the sprinkler head 10 of the present invention may be readily adapted for use in any sprinkler set-up where either rotary impact sprinkler heads have been previously used or where spray heads have been recently used in place of impacts. As previously indicated, the rotary sprinkler head 10 of the present invention achieves satisfactory operation at lower pressures than conventional rotary impact sprinkler heads and achieves a more desirable and extensive spray pattern that can be achieved with a comparably sized spray head. U.S. Pat. No. 4,405,085 discloses the mounting of spray heads on booms supported by drop tubes from the elevated conduit of a pivot move or lateral move irrigation system. The rotary sprinkler heads 10 of the present invention would be particularly useful with drop tubes and/or booms in the configuration as depicted in FIGS. 1–4.

The rotary sprinkler head 10 which is depicted in FIGS. 1–4 exemplifies a desirable configuration of the surface means 18 of the rotary distributor 16 when it is desired to project all of the water in the primary steam as a single stream. In the embodiment shown, the rotary distributor 16 is in the form of a molded body of suitable plastic material. An exemplary embodiment is nylon although it will be understood that other suitable plastic materials may be employed if desired. The rotary distributor 16, as shown, also includes a metal insert 40 which is integrally molded in the plastic body for accurately receiving one end of a mounting shaft 42 which extends axially from the rotary distributor body.

The surface means 18 which serves to engage the primary stream and to establish the reactionary force component and to direct all of the primary stream outwardly as a single stream is of course molded in the distributor body. The shape of the surface means can best be understood by considering the same to be formed by a spherical burr tool which is moved in cutting relation through the distributor body first downwardly and then outwardly and slightly upwardly toward the periphery at the same time moving arcuately rather than straight out radially. The characteristic of the surface means 18 thus formed is that the issuing stream which is defined by the surface has a major component in the radial direction with respect to the axis of the primary stream. Moreover, there is a slight upwardly component to the issuing stream which serves to achieve the greatest possible outward extent of movement of the stream and hence to define a maximum radius dimension for the resulting circular pattern area of the rotary sprinkler head 10. This direction of issuing stream movement is indicated in FIG. 2 and it will be noted that therefrom and from the plan view shown in FIG. 4 that the direction of the stream issuing from the surface means 18 is such that its axis is parallel with a radial line extending from the vertical axis of the primary stream. The extent of offset is slight so that the force component which acts in a tangential direction with respect to the axis of the rotary distributor to rotate the same is relatively small compared with the radially outward directional component of the stream. Nevertheless, this reactionary force component is considerably greater than would be required to rotate the distributor without a speed reducing assembly associated therewith at the slow speeds herein contemplated.

The speed reducing assembly 20 which is embodied in the rotary sprinkler head 10 is preferably a speed reducing assembly which operates on the principle of damping the rotational movement through viscous fluid shear between two relatively moving surfaces. The embodiment shown in FIGS. 1–4 is particularly constructed to cooperate with the tubular mounting portion 38 of the sprinkler body 12 constructed in accordance with the known manner previously described.

To this end, the speed reducing assembly 20 includes a first outer housing part 44 which includes a disk-shaped central portion 46 having a sleeve portion 48 extending outwardly therefrom which is adapted to engage within the tubular mounting portion 38 of the sprinkler body 12. In order to retain the upstanding sleeve portion 48 of the assembly housing part 44 within the mounting portion of the sprinkler body, the sleeve portion 48 has a pair of downwardly extending slits formed therein which define an integral resilient locking element 50 therebetween. As shown, the locking element 50 includes an enlarged head having an upwardly and outwardly facing cam surface 52 and a downwardly facing locking surface 54. With this arrangement, the outer housing part 44 can be simply pushed upwardly through the mounting portion 38 of the sprinkler body 12 which action cams the resilient locking element 50 radially inwardly by virtue of the engagement of the upper cam surface 52 thereof. When the housing part 44 has been moved fully into the mounting portion 38 of the sprinkler body 12 the enlarged head of the resilient locking element 50 moves radially outwardly into a slot or opening 56 formed in the tubular mounting portion 38 so as to provide an upwardly facing surface to lockingly engage the downwardly facing locking surface 54 of the resilient locking element 50.

The first housing part 44 also includes a downwardly extending peripheral flange 58 which is exteriorly threaded, as indicated at 60, to receive an interiorly threaded skirt portion 62 formed on a second housing part 64. The first housing part 44 also includes a inner upwardly extending hollow sleeve portion 66 which serves to receive a sleeve bearing 68. The mounting shaft 42 of the rotary distributor 16 extends into and is journalled within the sleeve bearing 68 and has its lower extremity disposed within a cavity or chamber 70 formed within the two housing parts 44 and 64.

Filled within the chamber 70 is a body of viscous fluid 72. The viscous fluid 72 may be of any known type, an exemplary embodiment being silicone. As shown, the lower extremity of the mounting shaft 42 of the rotary distributor 16 extends downwardly from the sleeve bearing 68 into the center of the chamber 70 and has fixed thereto the hub of a viscous fluid engaging member 74. As shown, the member 74 has a disk configuration which extends outwardly from the upper end of the hub. It will be noted that both the upper surface of the fluid engaging member 74 as well as the lower surface thereof is disposed in closely spaced proximity to the adjacent walls of the chamber 70 thus providing surfaces which are relatively movable and have viscous fluid 72 therebetween, which viscous fluid is sheared when the relative movement takes place. This viscous shearing dampens the rotatonal movement of the rotary distributor 16 and reduces its speed from a relatively high whirling speed which the rotary distributor would achieve if the speed reducing assembly 20 were eliminated to a relatively slow speed.

Examples of the speeds which are herein contemplated are a relatively high whirling speed of approximately 1800 revolutions per minute to a reduced operating speed of approximately 2.1 revolutions per minute. It will be understood that it is within the contemplation of the present invention to reduce the speed within an operative range of approximately ¼ r.p.m. to approximately 12 r.p.m. and somewhat thereabove. The advantage of utilizing a relatively slow speed, such as 2.1 r.p.m., is that the horse-tailing effect of the stream that issues from the surfaces 18 of the rotary distributor 16 is minimized and the stream projects outwardly for a distance substantially the same as the stream would project if the rotary distributor 16 were held stationary. By maximizing the outward extent of the stream, the circular pattern area of the sprinkler head is likewise maximized which is highly desirable. For example, the rotary distributor 16 which achieves a relatively slow operating speed of 2.1 r.p.m. serves to project the issuing stream operating a distance of approximately 16½ feet which compares favorably with an 18½ foot projection when the rotary distributor 16 is held stationary and the reduction in the pattern radius is only down to 89% of maximum. On the other hand, where the rotary distributor 16 is allowed to turn freely at 1800 r.p.m., the horse-tailing effect of the stream is so significant that the stream is almost immediately broken up into droplets which fall instantaneously throughout a circular pattern. This reduced circular pattern of coverage is effectively the same as the instantaneous pattern of the stream. The pattern area radius is reduced down to 70% of maximum resulting in a pattern area which is less than 50% of the maximum pattern area.

In the embodiment of the speed reducing assembly 20 shown in FIGS. 1–4, the viscous fluid 72 substantially fills the chamber 70 and can escape therefrom only after finally passing through a dynamic seal 76 which is provided exteriorly between the mounting shaft 42 and the sleeve bearing 68. Moreover, the shape of the chamber 70 is such that so long as the sprinkler head 10 is oriented in its operating position, the viscous fluid 72 will be retained within the chamber 70 by gravity without any tendency to leak. The seal 76 is provided primarily to prevent the ingress of deleterious material between the mounting shaft 42 and the sleeve bearing 68. However, as previously indicated, it also would have the effect of sealing in the viscous fluid 72 in the event that the same were to seep through the mating surfaces of the mounting shaft 42 and the sleeve bearing 68 while the sprinkler head 10 is inverted.

The filling of the chamber 70 with viscous fluid 72 has the advantage of physically excluding the entrance of moisture into the chamber 70 which could mix with the viscous fluid 72 and change its viscosity so as to allow the rotary distributor to run faster than desired. In conjunction with the filling of the chamber 70 with viscous fluid 72 it is desirable to provide a means for accommodating thermal expansion and contraction of the viscous fluid without an attendant increase or decrease in the pressure condition of the viscous material. Such a means is exemplarily shown in FIG. 2 as a diaphragm insert assembly 77 suitably fixedly mounted in a wall defining the chamber 70. As shown, the diaphragm insert assembly 77 is mounted in the annular radially extending wall of the second housing part 64 leading to the skirt portion 62 thereof.

It can be seen that the speed reducing assembly 20 is thus quite stable in operation and is capable of mounting the rotary distributor 16 for rotational movement and effectively reducing that speed to a constant value for any given primary stream. The relatively slow constant speed of rotation has its effect on the fallout of the stream which issues from the rotary distributor 16. Thus, the combination of the surface means 18 of the rotary distributor 16 and the speed reducing assembly 20 itself serves to condition the stream which issues from the rotary distributor 16 not only in the sense of its initial projecting direction but also its conditioning with respect to its fallout characteristics. The fallout characteristics have a determination effect on the water distribution within the circular pattern of the rotary sprinkler head 10. For example, where a major part of the water is projected out and falls adjacent the periphery of the circular pattern so that at the central portion of the pattern relatively little water is distributed, the water distribution is non-uniform. Where the water distribution is heavied up at the periphery of the circular pattern, this non-uniform distribution is conventionally referred to as a donut pattern distribution and a donut pattern is desirable in moving irrigation systems because a concentration is presented to the newly sprinkled earth which is capable of receiving the greatest amount of water without runoff.

The smoothness of the surface means 18 and the extent to which the primary stream is bent or redirected also has a significant effect on the fallout which occurs after the stream issues from the rotary distributor. In the embodiment shown in FIGS. 1–4, the surface means 18 is constructed to minimize the redirection of the primary stream and to always engage the stream with as smooth a surface as possible. Thus, the distribution pattern is a donut distribution.

It will be noted that when the issuing stream is directed toward the strut portions 34, the stream will be broken up and there will be relatively small segments behind the triangular shaped strut portions 34 which do not receive water distribution within the circular pattern. These non-wetted areas are considered insignificant particularly where the rotary sprinkler head 10 is being utilized in a moving irrigation system. Usually, full wetting within the circular pattern is desirable and in some embodiments as will be noted hereinafter a full wetting of the full circular pattern is accomplished. Nevertheless, the present invention contemplates a coverage within less than the full circular pattern and contemplates in this regard a part-circle operation as well.

Figure 5:
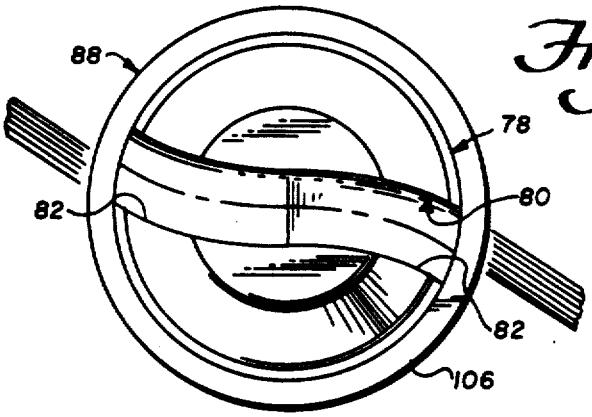
FIG. 5 is a top-plan view of a rotary distributor of a different form specifically for controlling the primary stream in such a way that it is divided into two streams which are directed outwardly in opposite directions.
Figure 6:
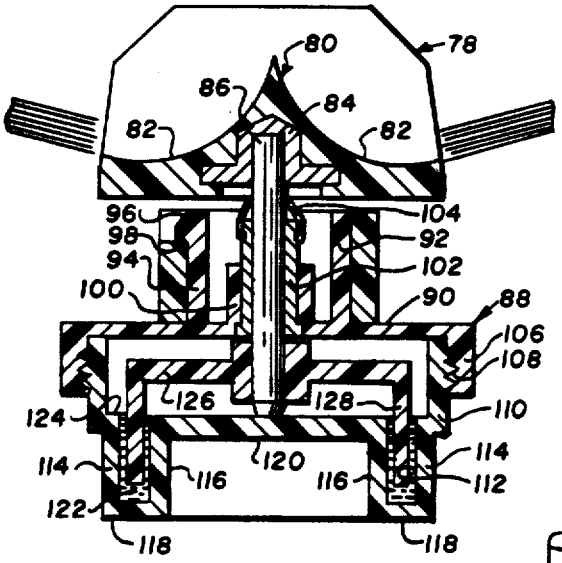
FIG. 6 is a vertical sectional view of the rotary distributor shown in FIG. 5 mounted in conjunction with a speed reducing assembly of modified form.

FIGS. 5 and 6 disclose modifications in the rotary distributor and in the speed reducing assembly that can be embodied in the sprinkler head 10 of the present invention. As shown in these Figures, there is provided a rotary distributor, generally indicated at 78, which includes surface means, generally indicated at 80, for engaging the primary stream and dividing the primary stream into two separate and generally equal streams and directing the same outwardly in generally opposite directions. It will be noted that the shape of the surface means 80 is such as to include two intersecting surfaces 82 similar in shape to the surface means 18 previously described except that they are displaced 180° with respect to one another and intersect one another along a perpendicular stream dividing line passing through the center.

As before, the rotary distributor 78 includes an insert 84 that serves to accurately receive the upper end of a mounting shaft 86.

FIG. 6 illustrates a modified speed reducing assembly, which is generally designated by the reference numeral 88. The assembly 88 includes a first housing part 90 which is substantially the same as the housing part 44 previously described. As such, there is included a sleeve portion 92, a resilient locking element 94 having an enlarged head with a cam surface 96 and a locking surface 98, an inner sleeve 100 which receives a sleeve bearing 102 having a dynamic seal 104 on the upper end thereof which engages the mounting shaft 86.

The first housing part 90 differs from the housing part 44 previously described in that it includes a depending peripheral skirt 106 which is internally threaded so as to cooperatively engage exterior threads on a upstanding peripheral portion 108 of a second housing part 110. The portion of the housing part 110 extending inwardly from the peripheral portion 108 is formed so as to provide an annular chamber 112 which is defined by an outer cylindrical wall portion 114, an inner cylindrical wall portion 116 and a annular bottom connecting wall portion 118. As shown, the upper end of the outer cylindrical wall portion 114 is integrally connected with the threaded peripheral wall portion 108 and a center wall portion 120 interconnects the upper end of the inner cylindrical wall portion 116.

As before, the annular chamber 112 is filled with viscous fluid 122. However, the filled chamber also communicates with a larger annular chamber 124 within which the lower end of the mounting shaft 86 extends. As before, a viscous fluid engaging member 126 is fixed to the lower end of the shaft 86 and is disposed within the chamber 112. As before, the member 126 is in the form of a hub having a disk projecting radially outwardly from its central portion. The member further includes a depending cylindrical skirt portion 128 extending downwardly from the outer end of the disk-like portion. It is the lower end of this annular skirt portion 128 which engages within the viscous fluid 122 filled within the annular chamber 112. The cylindrical exterior and interior surfaces of the skirt portion 128 cooperate, respectively, with the interior surface of the outer wall portion 114 and the interior surface of the inner wall portion 116 to provide the desired viscous shearing of the viscous fluid 122 suitable to accomplish the damping of the rotational speed of the rotary distributor 78 to a desired slow speed, such as previously indicated.

The advantage of the arrangement depicted in FIGS. 5 and 6 is that since the chamber 112 which contains the viscous fluid is in communication with an adjacent air chamber 124 of greater volume the expansion and contraction of the viscous fluid 122 due to the change in the temperature or weather conditions will have very little effect, if any, on the damping characteristics. Where the viscous fluid is completely filled within the chamber as in the embodiment described above with respect to FIGS. 1–4, there exist the possibility that the pressure of the viscous fluid could increase to a value above atmospheric pressure so as to tend to pass outwardly beyond the seal 74. Conversely, a negative pressure could be created in which case the negative pressure would serve to induce passage of deleterious material inwardly past the seal 74. For that reason, the use of what is effectively a partially filled chamber in the manner described above with reference to FIGS. 5 and 6 is sometimes preferable. The combined rotary distributor 78 and speed reducing assembly 88 depicted in FIGS. 5 and 6 would provide satisfactory use in pivot move systems where relatively large spray heads or impact heads have been previously used. The configuration of the surfaces 82 serve to divide the primary stream much in the same way that impact heads of larger capacities are provided with dual nozzles. It will be understood that the two streams may be made unequal by simply widening the surface resulting from one of the cuts while the other is narrowed. Moreover, one of the cuts could be made to extend perfectly radial so that all of the reactionary force component would be derived from the other cut. It will also be understood that more than two cuts may be provided but here again when such cuts are of equal size there is a substantial tendency to reduce cycle pattern size which is contrary to the most desired characteristic of the sprinkler head. Namely, to achieve as great a cycle pattern area as is practically possible commensurate with the securement of proper droplet size and water distribution with such a pattern.

Figure 7:
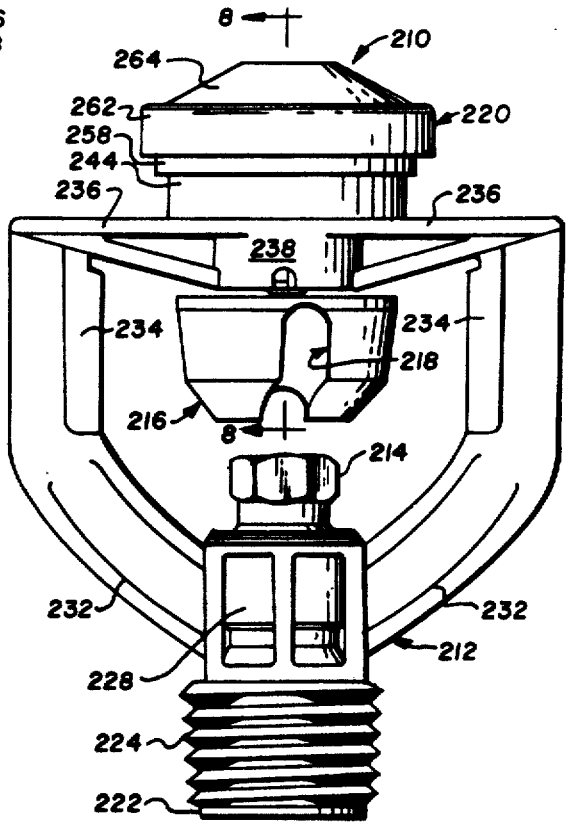
FIG. 7 is a view similar to FIG. 1 showing another form of rotary sprinkler head embodying the principles of the present invention.

In the embodiments of the invention thus far described, the sprinkler body 12 of the rotary sprinkler head 10 is oriented during operation so that the primary stream flows vertically downwardly. This orientation is representative of drop tube or boom mountings in pivot or lateral move systems. FIGS. 7 and 8 are representative of sprinkler head mountings directly on top of the main pipe in pivot move or lateral move systems.

In FIGS. 7 and 8, there is illustrated a modified sprinkler head 210 embodying the principles of the present invention. The sprinkler head 210 includes a sprinkler body, generally designated by the numeral 212, which is constructed exactly in accordance with sprinkler body 12 previously described. Consequently, a detailed description is not deemed necessary. Instead it is believed sufficient to note that in FIGS. 7 and 8 of the drawings comparable parts of the sprinkler body 212 are designated with comparable reference numerals except for the addition of the prefix number 2. Similarly, the rotary sprinkler head 210 includes an outlet nozzle 214, a rotary distributor 216 having primary stream engaging surface means 218, and a speed reducing assembly 220. With the above in mind, the sprinkler head 210 will be described with reference to the corresponding parts which differ from those previously described. The surface means 218 of the rotary distributor 216 is formed with surfaces 282 which are similar to the surfaces 82 except that they are inverted. Moreover, since the primary stream is moving upwardly rather than downwardly it is not necessary to turn it outwardly and then upwardly but rather simply outwardly to reduce the upward component until it equals the upward component desired. This difference in shape is clearly reflected in FIG. 8 when compared with FIG. 6.

The speed reducing assembly 220 is mounted above the sprinkler body mounting portion 238 and is formed of two housing parts 244 and 264. Housing part 244 includes means for securing the assembly 220 to the sprinkler body such as a depending outer sleeve portion 248 within which is formed a resilient locking element 250. The housing part 244 also includes an inner sleeve portion 266 which provides for the rotational mounting of the rotary distributor 214 as by an inner sleeve bearing 268. The housing part 244 also includes an upstanding exteriorly threaded peripheral portion 258. The second housing part 264 is in the form of a cap including a peripheral interiorly threaded wall portion 262. A chamber 270 is formed within the housing parts which has the shape of the two communicating chambers 112 and 124 previously described. A viscous fluid 272 fills the lower annular portion of the chamber 270. As before, a viscous fluid engaging member 274 is provided which has a shape similar to the member 126 previously described. It will be noted that the interior configuration and size of the chamber 270 and the amount of viscous fluid provided is such that no seal is required to keep the viscous fluid from leaking out of the chamber 270 around the shaft 242. This is clearly the case in the operating position shown and it is true even though the assembly might be stored in any position other than the operating position. It can be seen that the sprinkler head 210 will function in the same manner as the sprinkler head 10 previously described particularly in so far as the characteristics of the spray issuing from the surfaces 282 of the rotary distributor 212. Here again, the water distribution is essentially a donut distribution pattern.

Figure 9:
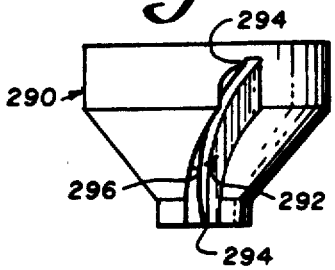
FIG. 9 is a side-elevational view of still another form of rotary distributor.
Figure 10:
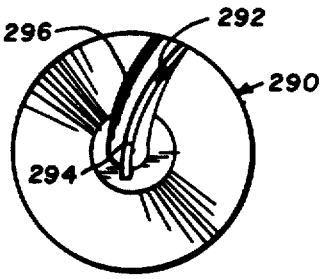
FIG. 10 is a bottom view of the rotary distributor shown in FIG. 9.
Figure 13:
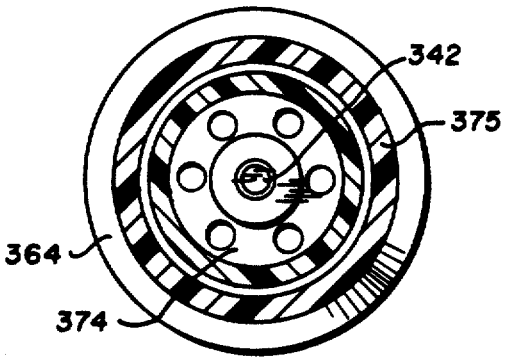
FIG. 13 is a sectional view taken along the line 13—13 of FIG. 12.
Figure 14:
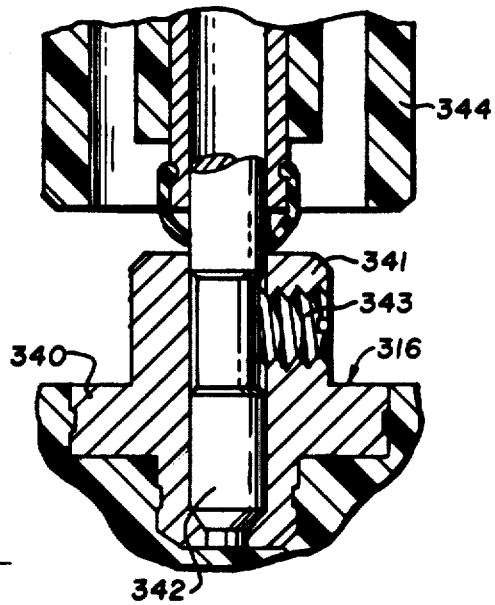
FIG. 14 is an enlarged fragmentary sectional view taken along the line 14—14 of FIG. 12.

FIGS. 9 and 10 illustrate a rotary distributor 290 that can be utilized in the sprinkler head 210 in lieu of the rotary distributor 216 previously described. The rotary distributor 290 illustrates an embodiment of primary stream engaging surface means 292 formed in the rotary distributor which would facilitate the securement of a substantially uniform distribution within the circular pattern area thus rendering the sprinkler head 210 more suitable for use in solid set systems or as a single applicator, such as for lawn use. As shown, the surface means 292 includes a narrow surface 294 superimposed upon a larger surface 296 formed essentially like the surface means 18 previously described except for the difference previously noted with respect to the inverted position thereof. The narrow surface 294 communicates throughout its extent with the larger surface 296. However their curvatures are different as can be seen from FIG. 10. The effect is to maintain the stream as it issues from the rotary distributor 290 as a single stream but with a relatively smaller portion having a directional component which causes that portion to drop out more quickly than the remainder as the stream flows outwardly from the rotary distributor. Consequently, more water than before is distributed within the central area of the circular pattern and less is delivered to the periphery resulting in a more uniform distribution throughout the pattern area. The communicating relationship between surfaces 294 and 296 is preferred since it leaves the total energy in a single stream as it leaves the distributor. Of course, they may be separated, if desired, and varied in size with respect to one another as well as curvature.

FIG. 11 illustrates a modified speed reducing assembly, generally indicated at 300, which can be utilized with the sprinkler head 210 in lieu of the speed reducing assembly 220. The assembly 300 includes a first housing part 302 which is similar to the housing part 244 previously described, except as to the interior surfaces which define an open cylindrical chamber 304 closed by a threadedly secured second housing cap part 306. Viscous fluid 307 partially fills the chamber 306 and a disk-shaped viscous fluid engaging member 308. It is the viscous fluid 307 between the bottom surface of the chamber 304 and the lower surface of the disk-like member 308 which is sheared to provide the damping effect. The amount of fluid above the disk-like member 308 does not have significant viscous shearing and hence does not have a significant effect on the damping provided. The arrangement therefore provides the same advantage as that embodied in the speed reducing assembly 88 of FIG. 6 and the speed reducing assembly 220 of FIGS. 7 and 8.

FIGS. 12 through 15 disclose still another embodiment of a rotary sprinkler head, generally indicated at 310, which embodies the principles of the present invention. The rotary sprinkler head 310 is particularly adapted to be utilized in pivot move systems or lateral move systems and specifically is arranged to accommodate orientation in an operative position similar to the sprinkler head 10 of FIGS. 1-4 or in the inverted position of the sprinkler head 210 illustrated in FIGS. 7 and 8. The rotary sprinkler head 310 is shown in FIG. 12 in a position corresponding with the position of the sprinkler head 210. Here again, the sprinkler head 310 includes a sprinkler body 312 which is similar to the sprinkler body 12 described above in connection with the sprinkler head 10. As with the sprinkler body 212, the sprinkler body 312 is inverted with respect to the sprinkler body 12 of FIG. 1. Thus, the portion of the sprinkler body 312 which includes the output nozzle is not illustrated although it will be understood that such a nozzle is provided and that the primary stream which is directed therefrom extends in an upward direction and engages a rotary distributor 316, shown in FIG. 12, which is provided with surface means 318 for directing the water in a manner previously described. In addition, the sprinkler 310 includes a speed reducing assembly 320 which is suitable for operation in either one of two operating positions, one of which is inverted with respect to the other.

The sprinkler body 312 is constructed exactly in accordance with the construction of the sprinkler body 12 previously described. Consequently, as before, a detailed description is not believed necessary. Instead it is believed sufficient to note that in FIGS. 12–15 of the drawings, comparable parts of the sprinkler body 312 are designated with comparable reference numerals except for the addition of the prefix number 3. The rotary distributor 316 is similar to the rotary distributor 16 previously described in that it is formed with a surface means 318 which is configured in relation to the surface means 18 just as the surfaces 282 are configured with respect to the surfaces 82. The rotary distributor 316 also includes an insert 340, however it differs from the insert 40 previously described in that it includes an axially outwardly projecting hub portion 341 which is adapted to receive the shaft 342 therein. The exposed hub portion 341 enables the user to readily replace the rotary distributor and for this purpose there is provided a set screw 343 which extends through the hub portion 341 in engagement with a suitable recess in the shaft 342, see FIG. 14.

The speed reducing assembly 320 is constructed similarly to the assemblies previously described in so far as the mounting of the same within the sprinkler body and the rotatable support which they provided for the rotary distributor is concerned. As before, the assembly 320 includes two housing parts 344 and 364. The housing part 344 is constructed most nearly like the housing part 244, shown in FIG. 8, except that the outer peripheral wall portion 358 forms a continuation of the outer cylindrical wall portion which forms the exterior of an annular chamber 370. It is only the lower section of the outer peripheral wall portion 358 which is exteriorly threaded to receive the interior threads on the generally cap shaped second housing part 364. The exterior surface of the peripheral wall portion 358 of the housing part 344 is smooth so as to receive an O-ring seal 359 mounted in a suitable groove within the peripheral wall portion 362 of the second housing part. The second housing part 364 rather than being a simple cap shape element has its center wall recessed inwardly so as to define the upper end of the chamber 370 with an annular shape similar to the lower end thereof defined by the first housing part 344.

As before, viscous fluid 372 of an amount sufficient to fill the lower annular portion of the chamber 370 is filled in the chamber. The viscous fluid engaging member 374 includes a single outer cyclindrical portion 375 the ends of which are disposed within the annular portions of the chamber.

It can be seen that when the rotary sprinkler head 310 is in the position shown in FIG. 12 with the primary stream being directed upwardly the viscous fluid 372 within the chamber 370 will be disposed within the annular portion provided by the first housing part 344. This position is clearly illustrated in FIG. 12 and it will be noted that the stream issuing from the surface means 318 will be directed outwardly and with a slight upward component.

Figure 15:
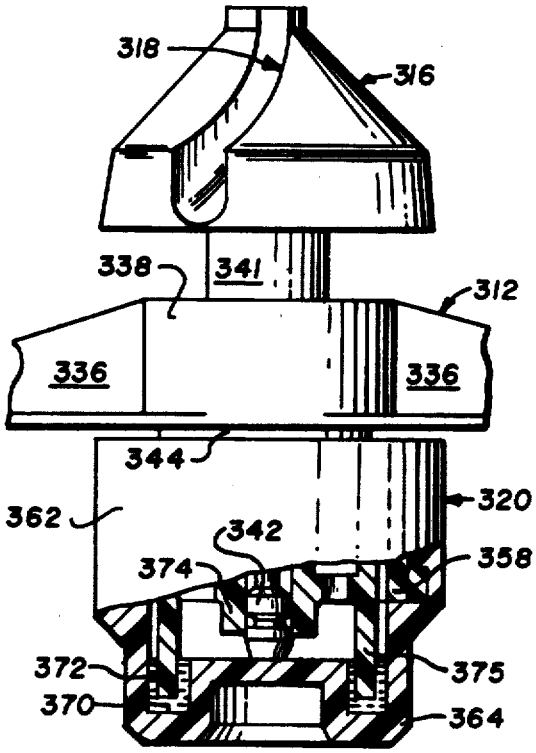
FIG. 15 is a view similar to FIG. 12 illustrating the sprinkler head in an inverted position with respect to that shown in FIG. 12.

FIG. 15 illustrates the position which the rotary sprinkler head 310 assumes when it is operating in an inverted position with respect to that shown in FIG. 12. It will be noted that the viscous fluid 372 has now drained into the annular portion of the chamber 370 which is defined by the second housing part 364. The arrangement provides all of the advantages heretofore noted with respect to FIGS. 6 and 8 in both operating positons. In the position shown in FIG. 15, the rotary distributor 316 may be utilized in which case the stream issuing from the distributor has a downward component. Alternatively, the rotary distributor 316 may be readily replaced by one which gives the stream a slight upward component of movement.

Figure 16:
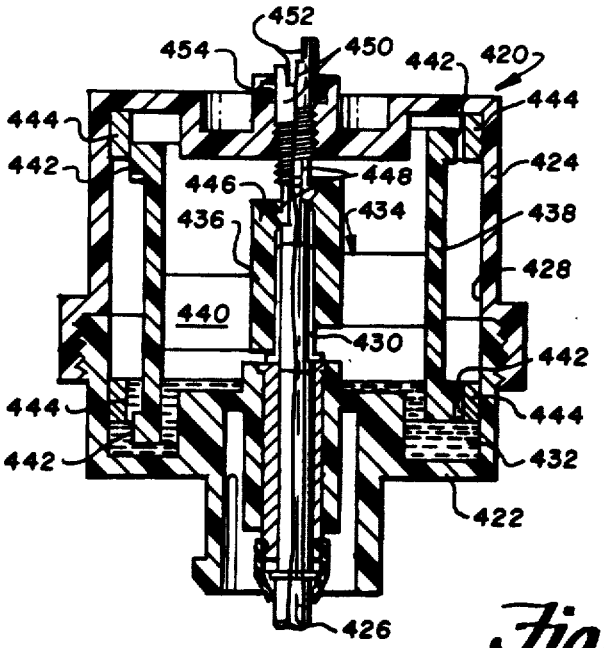
FIG. 16 is a composite sectional view in two halves of a speed reducing assembly of modified form capable of being manually adjusted, the two halves of the composite sectional view showing different positions of adjustment.

FIG. 16 illustrates a speed reducing assembly, generally indicated at 420, which is similar to the speed reducing assembly 320 shown in FIGS. 12–15, except that it is provided with two additional functional capabilities, one, the capability of manually adjusting the amount of viscous fluid shear which takes place and two, the function of compensating for viscosity changes in the viscous fluid due to temperature changes. As shown, the speed reducing assembly 420 includes a pair of housing parts 422 and 424. The one housing part 422 provides the means for effecting the fixed connection of the assembly 420 with the sprinkler body in the manner previously described and in addition provides for the mounting of the rotary distributor shaft 426. In the embodiment shown in FIG. 16, the shaft 426 is modified so that the upper end thereof which extends into an interior chamber 428 provided by the cooperating housing parts 422 and 424 is exteriorly splined as indicated at 430. Chamber 428 is partially filled with viscous fluid 432 and has therein a viscous fluid engaging member 434, which is mounted on the shaft 426 by an internally splined hub portion 436 so that the hub portion and hence the entire viscous fluid engaging member 434 can be moved axially with respect to the mounting shaft 426.

As shown, the vicous fluid engaging member 434 is provided with a cylindrical peripheral portion 438 which is connected with the hub portion 436 by radial spokes 440. Extending from the exterior of the cylindrical portion 438 at each end thereof are annular sections 442 having exterior cylindrical surfaces which cooperate with metal rings 444 mounted within the associated portions of the housing parts 422 and 424 respectively. The upper end of the hub portion 436 has a flanged section 446 above the interior spline for receiving a pair of spring gripping fingers 448 formed on the end of a manually adjustable stem 450 suitably threaded in the central portion of the housing part 424. As shown, an O-ring seal 454 is mounted within an appropriate groove in the housing part 424 so as to engage the smooth upper periphery of the stem 450. The outward extremity of the stem 450 is formed with a slot 452 for receiving a turning tool, such as a screwdriver, so as to enable the user to manually rotate the stem.

It can be seen that by manually rotating the stem 450, the spring fingers 448 will turn within the hub section 446 and the vertical component of movement of the stem 450 by virtue of its threaded connection will effect a vertical movement of the hub portion 436 with respect to the mounting shaft spline 430. This movement changes the dimension of the co-extension area between the exterior surface of the annular sections 442 and the interior surface of the rings 444. Since these surfaces constitute the primary area of viscous shear, the extent of the shear of the viscous fluid 432 within the chamber 428 is adjusted by virtue of the vertical movement of the member 434 within the chamber. The purpose of the manual adjustment is to accomodate different primary steam defining nozzle sizes and different rotary distributors used therewith as well as differing water source conditions.

With respect to the temperature compensation for viscosity changes, it will be noted that the viscous fluid engaging member 434 is formed of a suitable plastic material as, for example, nylon. The stator rings 444 on the other hand are formed of metal. The characteristics of the two materials are chosen such that the plastic part will, for example, shrink four to fourteen times as much as the metal part in response to decreases in temperature so that the clearance between the shearing surfaces will increase at lower temperatures thus decreasing the shearing as the viscosity of the viscous fluid becomes greater due to the lower temperatures. Conversely, as temperatures increase and the viscosity of the viscous fluid decreases, the clearance between the shearing surfaces will diminish due to the difference in expansion of the two parts so that there is provided compensation in both directions for viscosity changes due to temperature changes. The compensation insuring a constant rotational speed for the rotary distributor.

Figure 17:
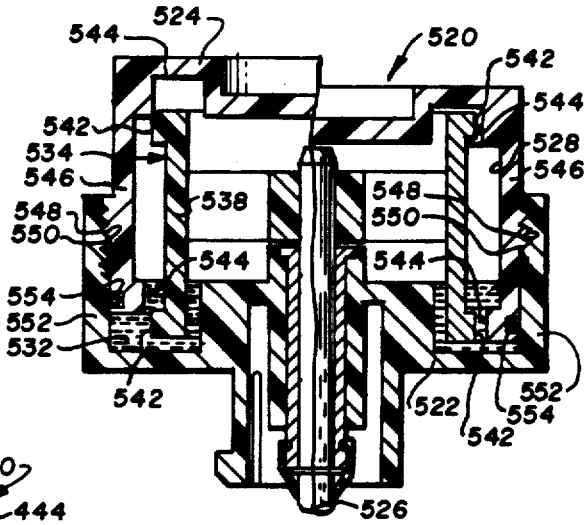
FIG. 17 is a view similar to FIG. 16 showing still another embodiment of a manually adjustable speed reducing assembly that can be utilized in the sprinkler head of the present invention.

FIG. 17 discloses still another speed reducing assembly, generally indicated at 520, which can be utilized in any of the rotary sprinkler heads previously described. As shown, the speed reducing assembly 520 includes the usual two housing parts 522 and 524. As before, one part 522 serves to fix the assembly 520 on the sprinkler body and to provide a mounting for the rotary distributor shaft 526. In the embodiment shown in FIG. 17, the housing parts 522 and 524 define an interior chamber 528 having therein viscous fluid 532 and a viscous fluid engaging member 534 which is constructed like the member 434 previously described except that its hub portion 536 is fixed to the mounting shaft 526. The viscous fluid engaging member 534 also includes a cylindrical peripheral portion 538 having exterior annular sections 542 on both ends thereof which cooperate with annular enlargements or shearing sections 544 formed on the interior periphery of the housing part 524 so as to extend inwardly from an outer peripheral wall 546 thereof.

The outer peripheral wall 546 of the housing part 524 is formed with an exterior central threaded section 548 which is adapted to engage interior threads 550 formed on a peripheral wall portion 552 of the housing part 522. An O-ring seal 554 is mounted within an exterior groove formed in the lower exterior surface of the peripheral wall portion 546 of the housing part 524 for sealably engaging the cylindrical interior surface of the peripheral wall portion 552 of the housing part 522 below the interiorly threaded section thereof.

It can be seen that by turning the housing part 524 with respect to the housing part 522 by virtue of the interengagement of the threaded sections 548 and 550, the viscous shearing sections 544 on the inner periphery of the housing part 524 can be moved into different axial positions with respect to the annular shearing sections 542 of the viscous fluid engaging member 534. This adjustment adjusts the amount of shear of the viscous fluid 532 between the surfaces and hence the damping in the manner previously described.

Figure 18:
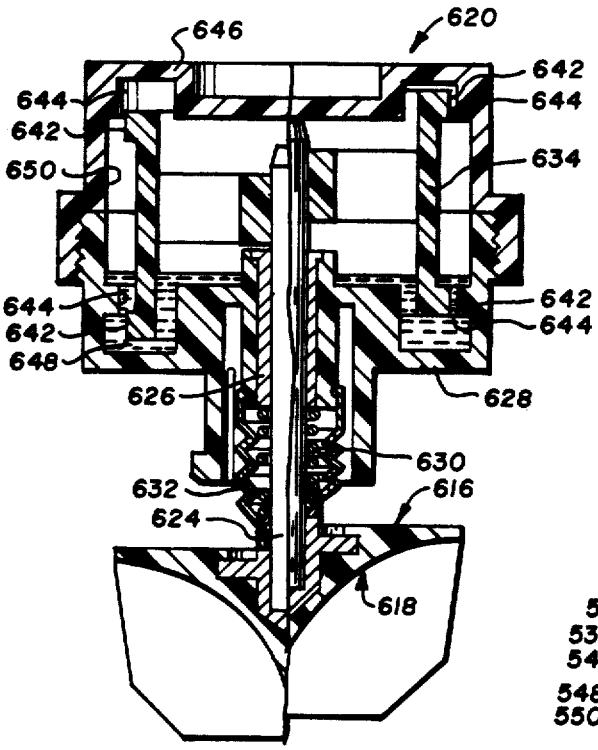
FIG. 18 is a view similar to FIGS. 16 and 17 showing an adjustable speed reducing assembly connected with the rotary distributor in such a way that changes in the conditions of the primary stream impinging on the rotary distributor due to changes in the pressure of the water source are automatically reflected as changes in the speed reducing assembly.

FIG. 18 discloses still another speed reducing assembly, generally indicated at 620, which is similar to the assemblies 420 and 520 previously described in that the assembly 620 is provided with the capability of adjustment of the viscous fluid shearing and hence damping provided but, in addition, is provided with the capability of sensing a change in a condition resulting from a change in the pressure of the water source of varying the variable damping capability in accordance with the change in condition sensed so as to maintain a generally constant reduced speed of the rotary distributor throughout a range of pressure changes in the water source. It is within the contemplation of the present invention to sense a change in any condition resulting from a change in the pressure of the source water. Thus, the sensor may be a pressure sensor, a speed change sensor, such as a fly-wheel governor or the like, or a position sensor for sensing a change in position resulting from a force application change due to pressure change in the primary stream.

Where the sensor senses a change in rotational speed or a change in the axial force acting on the rotary distributor due to a change in the viscosity and/or flow rate of the primary stream, the system automatically compensates for changes in the nozzle size utilized. Rotational speed and axis load are equally affected by changes in primary stream velocity and flow rate. Velocity is a function of source pressure. Flow rate is a function of source pressure and nozzle size. The ability to automatically compensate for the nozzle size utilized is a desirable feature in that it eliminates the necessity of the user making a manual adjustment in the speed reducing assembly after having chosen the desired nozzle size to utilize.

The embodiment shown in FIG. 18 senses a change in the axial force component of the primary stream reaction on the surface means 618 of the rotary distributor 616. To this end, the mounting shaft 624 the rotary distributor 616 is not only journaled within a sleeve bearing 626 mounted within a housing part 628 but is also mounted for limited longitudinal or axial movement within the bearing 626 as well. As shown, a coil spring 630 is disposed in surrounding relation to a portion of the mounting shaft 624 which extends outwardly from the sleeve bearing 626. The upper end of the coil spring 630 engages the sleeve bearing 626 while the other end engages the lower end of a bellows seal assembly 632, the opposite end of which is connected with the inner sleeve portion of the housing part 628.

It can be seen that when the primary stream impinges upon the surface means 618 of the rotary distributor 616 there is created by virtue of the shape of the surfaces an upward reactionary force component which tends to move the rotary distributor 616 upwardly together with its mounting shaft 624 against the bias of the spring 630. As the mounting shaft 624 is moved upwardly, a viscous fluid engaging member 634 fixed thereto, which is similar in construction to the members 434 and 534 previously described, is moved upwardly therewith so that the area of the viscous fluid shearing surfaces 642 thereof increases with respect to the cooperating surfaces 644 on the housing part 628 and a cooperating second housing part 646, so as to increase the amount of viscous shearing of a viscous fluid 648 within chamber 650 provided within the housing parts 628 and 646. In this way, the amount of damping provided is varied.

It can be seen that as the pressure of the source of water increases, the energy level of the primary stream issuing from the outlet nozzle will increase thus increasing the axial force component acting on the rotary distributor 616. The mounting of the rotary distributor by virtue of the spring 630 and the capability of its axial movement serves as a sensor for sensing the change in the axial force component. The arrangement is such that the sensing of the change automatically causes the viscous fluid engaging member 634 to be moved into a new position to compensate for the increased energy level in the primary stream which would tend to cause the rotary distributor to rotate faster by providing additional damping so as to maintain the rotational speed of the rotary distributor at a substantially constant level. Similarly, a decrease in the source pressure produces a condition of decreased energy level in the primary stream which, in turn, reduces the reactionary axial force component acting to depress spring 630. Spring 630 thus moves shaft 624 outwardly causing a lesser cooperating surface area between the shearing surfaces 642 and 644 which, in turn, reduces the viscous fluid shearing and hence the damping provided. The arrangement therefore maintains a generally constant speed of the rotary distributor for a relatively wide range of variation, both up and down, in the source pressure.

The rotary sprinkler heads 10, 110, 210 and 310 described above are all provided with a sprinkler body of a known construction which renders the related combined rotary distribution and speed reducing assembly susceptible of being simply attached to a sprinkler body of the type already in existence. With this feature is an advantage, a disadvantage of utilizing the existing sprinkler body is that the strut portions 34 are disposed in a position to engage the stream issuing from the rotary distributor so as to disrupt the distribution of the water within segments of the circular pattern corresponding in position to the position of the strut portions.

Figure 19:
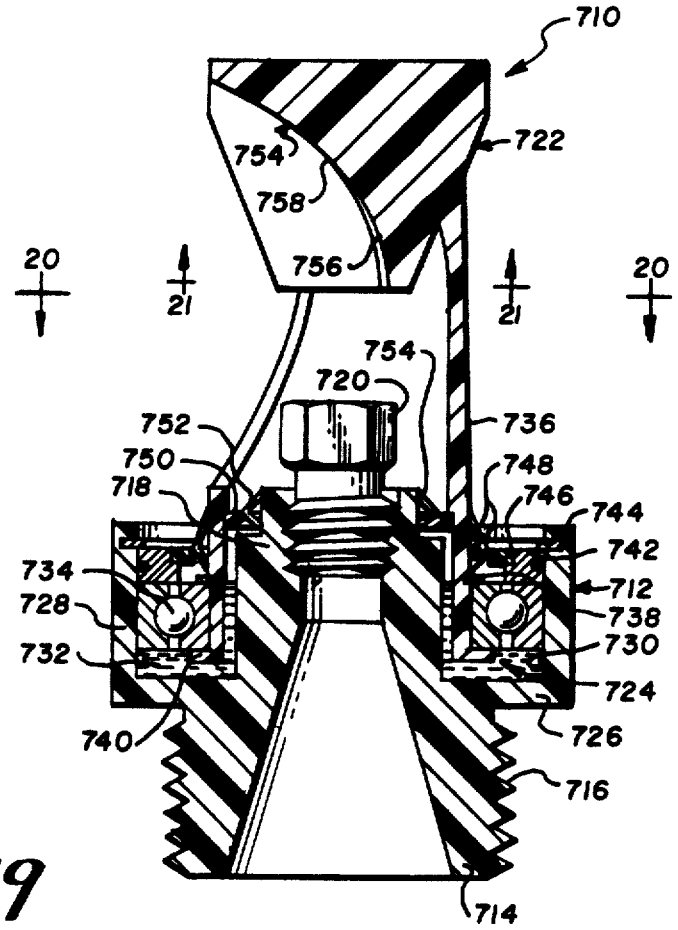
FIG. 19 is a vertical sectional view of a rotary sprinkler head of modified form which embodies the principles of the present invention.
Figure 21:
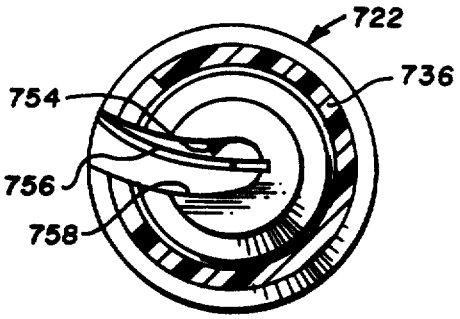
FIG. 21 is a sectional view taken along the line 21—21 of FIG. 19.
Figure 20:
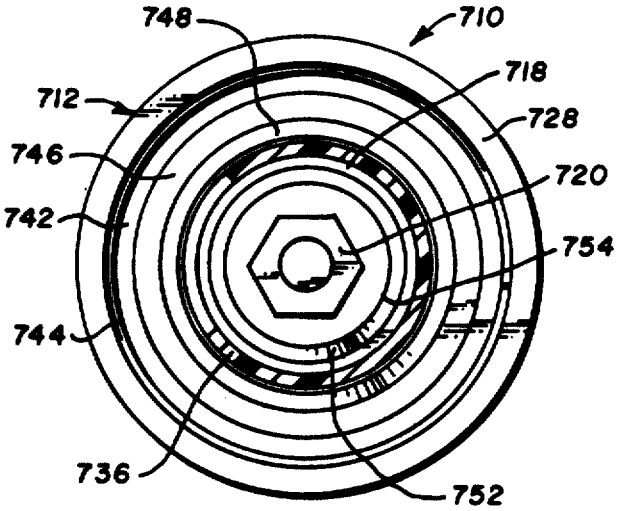
FIG. 20 is a sectional view taken along the line 20—20 of FIG. 19.

FIGS. 19 through 21 depict a rotary sprinkler head, generally indicated at 710, constructed in accordance with the principles of the present invention, which has the capability of eliminating the strut portions from engaging the stream issuing from the rotary distributor. As shown in FIG. 19, the rotary sprinkler head 710 includes a sprinkler body, generally indicated at 712, which includes a tubular inlet portion 714 exteriorly threaded, as indicated at 716, for engaging internal threads of a water source pipe (not shown). The sprinkler body 712 adjacent the inlet portion 714 includes a tubular outlet portion 718 which is interiorly threaded to receive a conventional outlet nozzle 720. Disposed in a position of substantial axial alignment with the outlet nozzle 720 is a rotary distributor, generally indicated at 722, which is associated with a speed reducing assembly, generally indicated at 724.

As shown, the sprinkler body 712 includes a radial wall portion 726, extending outwardly from the exterior of the tubular body portions 714 and 718 at a position adjacent the juncture thereof. Extending upwardly from the periphery of the radial wall portions 726 is a peripheral wall portion 728. The interior cylindrical surface of the periphery wall 728, the upper surface of the radial wall portion 726 and the exterior of the tubular outlet portion 718 define an annular chamber 730 within which a body of viscous fluid 732 is filled.

Mounted within the chamber 730 is a ball bearing assembly 734 the outer race of which is fixed to the central section of the cylindrical interior surface of the peripheral wall portion 728 and the inner race of which is connected with the lower exterior periphery of a tubular mounting shaft 736 which, as shown is integral with the rotary distributor 722. As shown, the viscous fluid 732 is filled within the chamber 730 up to the level of the upper surface of the ball bearing assembly 734. The primary surfaces for accomplishing the shearing of the viscous fluid 732 are the interior surfaces of the tubular shaft 736 which extend into the viscous fluid and the co-extensive area of the exterior periphery of the tublar outlet portion 718 of the sprinkler body 712. The mounting of the tubular shaft 736 by the ball bearing assembly 734 within the chamber 730 of the sprinkler body 712 includes a slit ring 738 engaged in a periphery groove within the tubular shaft 736 for engaging the upper end of the inner bearing race and a outwardly extending flange 740 on the inner end of the tubular shaft 736. The outer race of the ball bearing assembly 734 is fixed within the peripheral wall portion 728 of the sprinkler body 712 by a ring seal unit 742. A split ring 744 in an interior annular groove in the peripheral wall portion 728 serves to retain the seal unit 742 in position.

A flexible annular seal 746 is carried by the seal unit 742. The flexible seal 746 includes a pair of oppositely extending flexible lips 748 which sealingly engage the adjacent exterior periphery of the tubular shaft 736. The interior of the tubular shaft 736 is sealed with respect to the sprinkler body 712 by a flexible annular seal 750 having a pair of inner lips 752 which seal against an adjacent cylindrical surface 754 of the tubular outlet portion 718 of the sprinkler body 712.

The rotary distributor 722 as shown is provided with surface means 754 which is constructed in a manner similar to that described above in connection with the rotary distributor shown in FIGS. 9 and 10. Thus, there is a relatively narrow groove surface 756 formed within a relatively large groove surface 758, the two surfaces having different curvatures. It will be noted that the upper end of the tubular shaft 736 which is integrally connected with the rotary distributor 722 has an opening 760 formed therein which allows for the passage of the water from the primary stream outwardly in the manner previously described.

The rotary sprinkler head 710, shown in FIGS. 19–21, is particularly suitable for operation as a single unit for a lawn sprinkler in which case the inlet portion is suitably mounted within an appropriate base. Alternatively, the rotary sprinkler head could be utilized as the pop up sprinkler head in pop up sprinkler assemblies used in underground lawn and turf watering systems. The rotary sprinkler head 710 can also be utilized in agricultural sprinkler head applications of the type previously described. The level of the viscous fluid 732 within chamber 730 is shown with the thought that the rotary sprinkler head 710 will always be used in the operating position shown. Where dual inverted operative positions are contemplated, the chamber 730 may be filled in the manner suggested in the embodiment of FIGS. 1–4 or the arrangement may be modified to follow the structural arrangement of FIGS. 12–18.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A rotary sprinkler head comprising:

a sprinkler body having an outlet and means devoid of any operative dynamic seals for communicating a source of water under pressure with said outlet, said outlet being defined by surface means for directing water under pressure communicated therewith into an atmospheric condition in a primary stream having a generally vertically extending axis, a rotary distributor mounted for rotational movement about a rotational axis with respect to said sprinkler body in engaging relation with respect to the primary stream directed from said outlet, said rotary distributor having surface means for engaging the primary stream (1) to establish a reactionary force component acting on said distributor in a direction tangential to the rotational axis thereof so as to effect rotational movement thereof about said axis of rotation and (2) to direct the primary stream engaged thereby in the form of pattern forming stream means including at least one stream moving away from said distributor in a direction having a substantial component extending radially outwardly from the generally vertical axis of said primary stream, speed reducing means operatively associated with said distributor for reducing the rotational speed of the distributor resulting from said reactionary force component from a relatively high whirling speed which would occur without said speed reducing means to a relatively slow speed so related to the distributor surface means forming the pattern forming stream means as to permit (1) said one stream to leave said distributor surface means with sufficient stream integrity to flow outwardly a distance substantially as great as the same said one stream would flow if the distributor were held stationary and (2) all of the pattern forming stream means including said one stream to be distributed within a generally circular pattern with a desired droplet size and with a desired water distribution within said generally circular pattern, the radius of said generally circular pattern being defined by the maximum extent of flow of said one stream.

2. A rotary sprinkler head as defined in claim 1 wherein the direction said one stream moves away from said distributor includes an upward component.

3. A rotary sprinkler head as defined in claim 1 wherein said one stream comprises the entire pattern forming stream means.

4. A rotary sprinkler head as defined in claim 1 wherein said pattern forming stream means includes a second stream moving away from said distributor in a direction having a component extending radially outwardly from the fixed axis of said primary stream.

5. A rotary sprinkler head as defined in claim 4 wherein said second stream is generally equal in size in comparison with said one stream and moves away from said distributor in a direction having a component extending radially outwardly from the fixed axis of said primary stream which is equal to and diametrically opposed to the component extending radially outwardly from the axis of the primary stream in the direction said one stream moves away from said distributor.

6. A rotary sprinkler head as defined in claim 1 wherein said pattern forming stream means is distributed substantially throughout the entire area of said generally circular pattern.

7. A rotary sprinkler head as defined in claim 6 wherein the distribution of the pattern forming stream means substantially throughout the entire area of said generally circular pattern is such that generally more water is distributed within a peripheral area adjacent the outer periphery of the circular pattern than within the inner center area thereof.

8. A rotary sprinkler head as defined in claim 6 wherein the distribution of the pattern forming stream means substantially throughout the entire area of said generally circular pattern is generally uniform throughout.

9. A rotary sprinkler head as defined in claim 1 wherein said speed reducing means comprises housing means fixed with respect to said sprinkler body having interior surfaces defining a chamber having a body of viscous fluid therein, said rotary distributor being fixedly mounted on a mounting shaft, said housing means carrying a bearing, said mounting shaft extending through said bearing in journaled relation therewith and into said chamber, a viscous fluid engaging member fixed on said shaft within said chamber and so related to the interior surfaces defining said chamber that viscous shearing of the viscous fluid takes place during rotation of said rotary distributor sufficient to effect the desired speed reduction.

10. A rotary sprinkler head as defined in claim 9 wherein said viscous fluid engaging member is of annular disk-like configuration.

11. A rotary sprinkler head as defined in claim 9 wherein said viscous fluid engaging member is of generally cylindrical configuration.

12. A rotary sprinkler head as defined in claim 9 wherein said bearing is a sleeve bearing and has an annular seal on the outwardly extending end thereof engaging the rotary distributor shaft.

13. A rotary sprinkler head as defined in claim 9 wherein said viscous fluid fills said chamber.

14. A rotary sprinkler head as defined in claim 9 wherein said viscous fluid fills only a portion of said chamber within which said viscous fluid engaging member is situated, the portion of said shaft initially communicating with said chamber being spaced from said viscous fluid when said sprinkler head is oriented in an operative position or in any other stored orientation thereof.

15. A rotary sprinkler head as defined in claim 14 wherein said rotary sprinkler head is capable of being operated in the aforesaid operating position and alternatively in a second operating position inverted with respect to said first mentioned operating position, said chamber having a second portion which said viscous fluid fills when said sprinkler head is in said second operating position, said viscous fluid engaging member having a first portion engaging said viscous fluid when the latter fills said first mentioned chamber portion and a spaced second portion which engages said viscous fluid when the latter fills said second chamber portion.

16. A rotary sprinkler head as defined in claim 15 wherein each of said chamber portions are defined by inner and outer cylindrical wall portions closed at one end by an annular wall which is oriented at the bottom ends of the cylindrical wall portions when the associated chamber portion is filled with viscous fluid.

17. A rotary sprinkler head as defined in claim 16 wherein means is provided for varying the relative positions of the interior surfaces which effect the viscous shearing defining said chamber and the surfaces of said viscous fluid engaging member which effect the viscous shearing so as to vary the amount of viscous shearing of the viscous fluid that takes place during rotation of said rotary distributor so as to vary the extent of speed reduction.

18. A rotary sprinkler head as defined in claim 17 wherein said relative positions varying means includes means for manually effecting the variation.

19. A rotary sprinkler head as defined in claim 17 wherein said housing means includes a movable housing part threadedly engaged on a fixed housing part, said relative position varying means comprising interior viscous fluid shearing surfaces on said movable housing part.

20. A rotary sprinkler head as defined in claim 17 wherein said viscous fluid engaging member is splined to said mounting shaft and said relative position varying means comprises means for moving said viscous fluid engaging member along its splined connection with said shaft.

21. A rotary sprinkler head as defined in claim 20 wherein said interior viscous fluid shearing surfaces are provided on rings made of metal, said viscous fluid engaging member being made of plastic so as to vary the spacing between the cooperative fluid shearing surfaces in accordance with variations in viscosity of the viscous fluid due to temperature variations so as to maintain a substantially constant revolutionary speed of said rotary distributor.

22. A rotary sprinkler head as defined in claim 17 wherein said relative position varying means includes sensing means for sensing a change in condition resulting from a change in the pressure of the water source and means for effecting the variation of said relative position varying means in accordance with the change in condition sensed so as to maintain a generally constant reduced speed of said rotary distributor throughout a range of pressure changes in the water source.

23. A rotary sprinkler head as defined in claim 22 wherein said condition sensed is the axial reactionary force component on said rotary distributor as a result of the engagement of the primary stream with the surface means thereof.

24. A rotary sprinkler head as defined in claim 23 wherein said sensing means comprises a spring connected to said mounting shaft so as to resiliently urge the same toward a limiting position in a direction opposed to the direction of the primary stream while yielding to allow axial movement of the mounting shaft in the opposite direction.

25. A rotary sprinkler head as defined in claim 9 wherein means is provided for varying the relative positions of the interior surfaces which effect the viscous shearing defining said chamber and the surfaces of said viscous fluid engaging member which effect the viscous shearing so as to vary the amount of viscous shearing of the viscous fluid that takes place during rotation of said rotary distributor so as to vary the extent of speed reduction.

26. A rotary sprinkler head as defined in claim 25 wherein said relative positions varying means includes means for manually effecting the variation.

27. A rotary sprinkler head as defined in claim 25 wherein said housing means includes a movable housing part threadedly engaged on a fixed housing part, said relative position varying means comprising interior viscous fluid shearing surfaces on said movable housing part.

28. A rotary sprinkler head as defined in claim 25 wherein said viscous fluid engaging member is splined to said mounting shaft and said relative position varying means comprises means for moving said viscous fluid engaging member along its splined connection with said shaft.

29. A rotary sprinkler head as defined in claim 9 wherein said interior viscous fluid shearing surfaces are provided on rings made of a first material, said viscous fluid engaging member being made of a second material, said first and second materials having differing coefficients of thermal expansion so as to vary the spacing between the cooperative fluid shearing surfaces in accordance with variations in viscosity of the viscous fluid due to temperature variations so as to maintain a substantially constant revolutionary speed of said rotary distributor.

30. A rotary sprinkler head as defined in claim 25 wherein said relative position varying means includes sensing means for sensing a change in condition in the primary stream and means for effecting the variation of said relative position varying means in accordance with the change in condition sensed so as to maintain a generally constant reduced speed of said rotary distributor.

31. A rotary sprinkler head as defined in claim 30 wherein said condition sensed is the axial reactionary force component on said rotary distributor as a result of the engagement of the primary stream with the surface means thereof.

32. A rotary sprinkler head as defined in claim 31 wherein said sensing means comprises a spring connected to said mounting shaft so as to resiliently urge the same toward a limiting position in a direction opposed to the direction of the primary stream while yielding to allow axial movement of the mounting shaft in the opposite direction.

33. A rotary sprinkler head as defined in claim 1 wherein said sprinkler body is formed with a tubular inlet portion coaxially adjacent said outlet, said outlet being tubular and having arm portions extending outwardly therefrom at diametrically opposed positions, strut portions extending generally vertically from the outer ends of said arm portions, a pair of connecting portions extending inwardly from the ends of said strut portions and a tubular mounting portion fixed to said connecting portions, said speed reducing means including housing means having a sleeve portion fixedly engagable with the tubular mounting portion of said sprinkler body.

34. A rotary sprinkler head as defined in claim 33 wherein said sleeve portion is slit to form an integral resilient locking element having an enlarged head formed with a cam surface for engaging said tubular mounting portion and a locking surface for engaging within a recess in said tubular mounting portion.

35. A rotary sprinkler head as defined in claim 1 wherein said sprinkler body is formed with a tubular inlet portion coaxially adjacent said outlet, said outlet being tubular, an annular member journaled in surrounding relation with said tubular outlet, and means extending axially outwardly with respect to said annular member for fixedly connecting said rotary distributor thereto.

36. A rotary sprinkler head as defined in claim 1 wherein means is provided for sensing a change in condition resulting from a change in the pressure of the water source, and means for varying the speed reducing means in accordance with the change in condition sensed so as to maintain a generally constant reduced speed throughout a range of pressure changes in the water source.

37. A rotary sprinkler head as defined in claim 1 wherein said whirling speed is of the order of 1800 r.p.m. and said reduced speed is within the range of from ¼ r.p.m. to 12 r.p.m.

38. A rotary sprinkler head as defined in claim 1 wherein said one stream is formed by stepped surfaces establishing portions of said one stream which have different directional components so as to cause said different portions to fall out differently.

39. A rotary sprinkler head as defined in claim 1 wherein means is provided for sensing a change in condition in the primary stream and means for varying the speed reducing means in accordance with the change in condition sensed so as to maintain a generally constant speed of said rotary distributor.

*40. A rotary sprinkler comprising:*

*a body portion having an inlet for receiving water under pressure and an outlet for discharging a stream of water to atmosphere;*

*a distributor rotatable relative to said body portion and supported at one end of a shaft mounted for rotation within a bearing, said distributor having at least one surface for engaging the stream discharged from said outlet such that upon engagement with said stream, said distributor is caused to rotate; and*

*a brake assembly for reducing rotational speed of said distributor, said brake assembly including a brake element mounted for rotation on said shaft remote from said one end, such that said bearing is located intermediate said distributor and said brake element.*

*41. A rotary sprinkler according to claim 40 wherein said bearing is mounted in said brake assembly and wherein said brake assembly includes a tubular support carried by said body portion, said brake assembly further including a chamber receiving said brake element for rotation therein.*

*42. A rotary sprinkler according to claim 41 wherein said chamber is substantially filled with a viscous fluid.*

*43. A rotary sprinkler according to claim 42 wherein said chamber is at least partially defined by a peripheral wall, and wherein said brake element includes a fluid engaging member in close proximity to said peripheral wall to effect shearing of said viscous fluid upon rotation of said brake element.*

*44. A rotary sprinkler assembly according to claim 40 wherein said distributor comprises an annular member, and wherein said at least one surface comprises at least one groove having an inlet end substantially coaxially aligned with and vertically spaced from said sprinkler body portion outlet and extending along a vertically and horizontally curved path to an exit end located outwardly of said inlet end, thereby causing said distributor to rotate upon passage of fluid therethrough.*

*45. A rotary sprinkler assembly according to claim 44 wherein said groove has a relatively narrow surface configuration extending along at least a part of the groove, said narrow surface configuration having a curvature different from the curvature of the groove.*

*46. A rotary sprinkler comprising:*

*a sprinkler body having an inlet and an outlet, said outlet mounting a removable outlet nozzle;*

*a distributor supported at one end of a rotatable shaft and axially spaced from said outlet nozzle, said distributor having at least one surface for engaging a liquid stream discharged from said outlet nozzle, and for causing the distributor to rotate, said shaft mounted for rotation in a bearing supported in a brake assembly housing, said housing including a chamber substantially filled with a viscous fluid; and*

*a brake element secured to the other end of said shaft and located within said chamber to dampen rotation of said shaft and said distributor.*

*47. A rotary sprinkler as defined in claim 46 wherein said brake assembly housing is mounted within a support member carried by said sprinkler body.*

*48. A rotary sprinkler as defined in claim 47 and further including a dynamic seal associated with said bearing and engaging said shaft.*

*49. A rotary sprinkler as defined in claim 46 wherein said brake assembly and said brake element are effective to reduce rotational speed of the distributor from an unbraked turning speed of about 1800 r.p.m. to a braked turning speed of about ¼ to about 12 r.p.m.*

*50. A rotary sprinkler as defined in claim 46 wherein said brake assembly and said brake element are effective to maintain sprinkling pattern area radius at about 89% of sprinkling pattern area radius of said distributor held stationary.*

*51. A rotary sprinkler head comprising:*

*a non-rotational sprinkler body including an inlet and an outlet, said outlet including a nozzle for discharging a fluid stream under pressure to atmosphere;*

*a rotatable distributor supported by said sprinkler body and axially spaced downstream from said nozzle, said distributor aligned with said outlet and including surface means for receiving and deflecting said stream, said surface means configured to cause rotation of said distributor upon receiving said stream; and*

*braking means for reducing rotational speed of said distributor by a factor of between about 150 and about 7000, wherein said distributor is mounted on one end of a shaft, the other end of the shaft received within said braking means.*

*52. A rotary sprinkler head as defined in claim 51 wherein said braking means comprises a brake assembly housing, said shaft being journalled in a bearing located within said brake assembly housing; a brake element mounted on said other end of said shaft and disposed within a chamber provided in said housing, said chamber being substantially filled with viscous fluid.*

*53. A rotary sprinkler head as defined in claim 52 wherein said chamber is at least partially defined by a peripheral wall, and wherein said brake element includes a fluid engaging member in close proximity to said peripheral wall to effect shearing of said viscous fluid upon rotation of said brake element.*

*54. A rotary sprinkler head as defined in claim 52 wherein said braking means is operative when said sprinkler head is in either of at least two positions, one of which is inverted with respect to the other.*

*55. A rotary sprinkler head comprising:*

*a non-rotational sprinkler body including an inlet and an outlet, said outlet including a nozzle for discharging a stream under pressure to atmosphere;*

*a rotatable distributor supported by said sprinkler body and axially spaced downstream from said nozzle, said distributor including at least one surface at one end thereof for receiving and deflecting said stream, said surface configured to cause rotation of said distributor upon receiving said stream; and*

*braking means for reducing rotational speed of said distributor from about 1800 r.p.m. to between about ¼ and about 12 r.p.m.;*

*wherein said distributor is mounted on one end of a shaft, the other end of said shaft received within said braking means.*

*56. A rotary sprinkler head as defined in claim 55 wherein said braking means is operative when said sprinkler head is in either of at least two positions, one of which is inverted with respect to the other.*

*57. A rotary sprinkler head as defined in claim 55 wherein said other end of said shaft is journalled within a bearing within said braking means.*

*58. A rotary sprinkler head as defined in claim 57 wherein said braking means includes a housing supported*

*by said sprinkler body such that said distributor, said shaft and said bearing are in axially spaced alignment with said nozzle.*

*59. A rotary sprinkler comprising:*

*a sprinkler body having an inlet and an outlet for discharging a stream to atmosphere;*

*a distributor supported at one end of a rotatable shaft and spaced from said outlet, said shaft mounted for rotation within a bearing, said distributor having at least one surface for engaging a stream discharged from said outlet;*

*a brake element for reducing rotational speed of said distributor, said brake element mounted for rotation on said shaft remote from said one end, such that said bearing is located intermediate said distributor and said brake element;*

*said at least one surface and said brake element cooperative to produce a substantially donut-shaped sprinkling pattern.*

*60. A rotary sprinkler head comprising:*

*a sprinkler body provided with an inlet for receiving a pressurized fluid, and an outlet for discharging said fluid as a primary stream, said sprinkler body having no dynamic seals therein;*

*a distributor rotatable relative to said body and supported at one end of a shaft mounted for rotation within a bearing, said distributor having at least one surface for engaging said primary stream discharged from said outlet;*

*a viscous brake assembly including a brake element for reducing rotational speed of said distributor, said brake element mounted for rotation on said shaft remote from said one end, such that said bearing is located intermediate said distributor and said brake element.*

* * * * *